United States Patent [19]

Welch

[11] Patent Number: 5,373,608
[45] Date of Patent: Dec. 20, 1994

[54] COOKING VESSEL HANDLE

[75] Inventor: Michael H. Welch, Virginia Beach, Va.

[73] Assignee: Welch Distributing Company, Virginia Beach, Va.

[21] Appl. No.: 210,036

[22] Filed: Mar. 17, 1994

[51] Int. Cl.$^5$ .................... A47J 45/06; A47J 45/07; A47J 45/10
[52] U.S. Cl. .................... 16/114 A; 16/110 A; 99/403
[58] Field of Search .................... 99/337, 403, 646 R; 16/114 A, 110 A, 114 R, 110 R, DIG. 24; 220/752, 759, 912; 294/27.1, 33

[56] References Cited

U.S. PATENT DOCUMENTS

| | | | |
|---|---|---|---|
| 2,494,159 | 1/1950 | Bernstein | 16/114 A |
| 3,186,026 | 6/1965 | Serio | 16/114 A |
| 3,269,765 | 8/1966 | Pryce | 16/114 A |
| 3,691,605 | 9/1972 | Witte | 29/200 J |
| 3,878,584 | 4/1975 | Witte | 16/110 A |
| 4,019,221 | 4/1977 | Baumgarten | 16/114 A |
| 4,083,081 | 4/1978 | Witte | 16/114 A |
| 4,206,853 | 6/1980 | Iten et al. | 220/94 R |
| 4,577,367 | 3/1986 | Durand | 16/DIG. 24 |
| 4,782,555 | 11/1988 | Fischbach | 16/110 A |
| 4,825,505 | 5/1989 | Witte | 16/110 A |
| 4,965,907 | 10/1990 | Baumgarten | 220/759 |
| 4,974,287 | 12/1990 | Fischbach | 16/114 A |
| 5,170,695 | 12/1992 | Chang | 99/403 |
| 5,175,907 | 1/1993 | Baumgarten | 16/110 A |
| 5,213,028 | 5/1993 | Chang | 99/340 |

FOREIGN PATENT DOCUMENTS

| | | | |
|---|---|---|---|
| 2683136 | 5/1993 | France | 16/110 A |
| 2314431 | 10/1974 | Germany | 16/110 A |

Primary Examiner—Timothy F. Simone
Attorney, Agent, or Firm—Olive & Olive

[57] ABSTRACT

A cooking vessel is provided with a removable handle. The handle is engaged with the vessel through use of a channel mounted on the end of the handle which mates with a rail mounted on the vessel. The channel and rail are further fitted with a mating pin and slot to assure alignment when engaged and with a pivotably mounted cam lock to retain engagement therebetween.

10 Claims, 2 Drawing Sheets

COOKING VESSEL HANDLE

FIELD OF THE INVENTION

This invention relates to cooking vessels and more particularly to removable handles for cooking vessels.

BACKGROUND OF THE INVENTION

A cooking vessel such as a metal formed pot, skillet, kettle or frying pan is typically provided with a thermally insulative handle for ease of handling and safety of use. Although the typical handle is permanently attached to the vessel, there are many reasons for having the handle detachable at certain times and for specific functions.

Even though the conventional handle does not conduct heat as well as does the metal body of the vessel, it can nonetheless, depending on the length of the handle and the cooking conditions, become moderately hot, thus making the handle uncomfortable to touch. While on a stove top, a vessel handle can be accidentally hit, causing a spill. In addition, a conventional vessel and attached handle occupies a substantial amount of storage space. For purposes of storage, the vessel without a handle attached will be able to fit in a smaller space both in the kitchen cabinet and in the refrigerator. A set of vessels of similar shape and sequential sizes which have separable handles may be nested inside one another when the handles are removed.

Other reasons for supplying a removable handle for a vessel are to be able to use a single handle interchangeably for a number of vessels and to change from a utilitarian-style handle for cooking operations to a decorative handle for serving the food at the table. Providing a separable handle also allows one to be able to wash the vessel body in a dishwasher without the handle, thus saving space and keeping the handle appearance from being affected by the dishwasher chemicals and heat.

Such a removable handle should mount securely to the vessel when in use and be easily attachable and removable by the cook.

It is therefore an object of this invention to provide a cooking vessel handle which is easily attached to and removed from a vessel.

It is a further object of this invention to provide a removeably attachable cooking vessel handle which is securely mounted to the cooking vessel when in use.

It is another object of this invention to provide a removeably attachable cooking vessel handle which is interchangeable for use on several types of cooking vessels.

Other objects and advantages will be more fully apparent from the following disclosure and appended claims.

SUMMARY OF THE INVENTION

The present invention provides a removeably attachable handle for a metal formed cooking vessel. The attachment means provides a strong and secure connection between the handle and the vessel and comprises a pair of complementary engagement components which, by way of illustration, are shown as a rail and a channel. In the preferred embodiment, the rail is mounted by welding to the side of the vessel and the channel is mounted by screws to the handle. The channel has an open top so as to slide onto the rail from below. The rail is formed with a slot in its lower surface and the channel with a mating pin in its lower surface which is positioned to engage the slot and act as a stop to fix the relative position of the handle on the vessel.

DETAILED DESCRIPTION OF THE INVENTION

Figure 1:
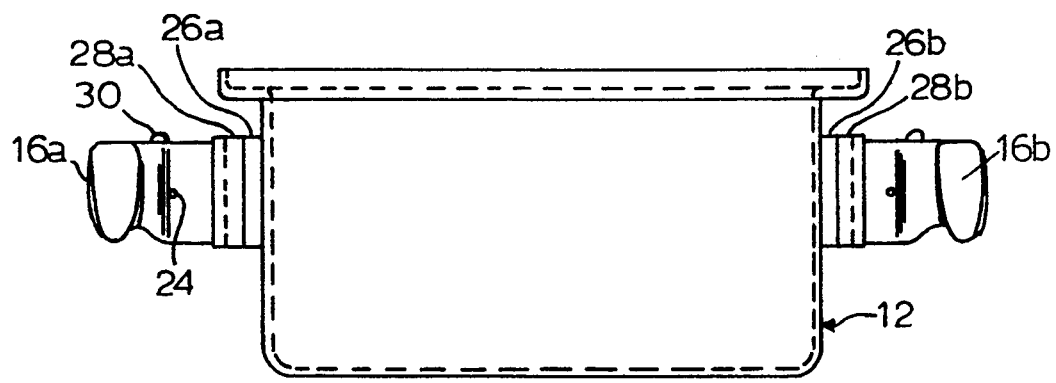
FIG. 1 is a side elevation view of a cooking vessel having two removable kettle handles attached thereto according to the invention.

The cooking vessel 12 illustrated in FIG. 1 is of a style generally known as a kettle or soup pot. The kettle 12 is characterized as having a pair of opposed handles 16a, 16b which are each short so as to be close to the sides of kettle 12. Each of the handles 16a, 16b is removeably attached to the kettle 12 by the mechanism of the invention disclosed herein.

Kettle 12 is fabricated with a pair of opposed rails 26a, 26b in the position shown on opposite sides of kettle 12 where the handles are to attach. Channels 28a, 28b are fixedly attached to the inner ends of respective handles 16a, 16b in an orientation to slidingly engage rails 26a, 26b respectively. A cam lock 30 is pivotably mounted on a pivot pin 24 on each handle 16a, 16b so as to move from an unlocked position when either handle 16a or 16b is unsecured to a locked position when it is desired that handles 16a, 16b be secured in place.

Figure 2:
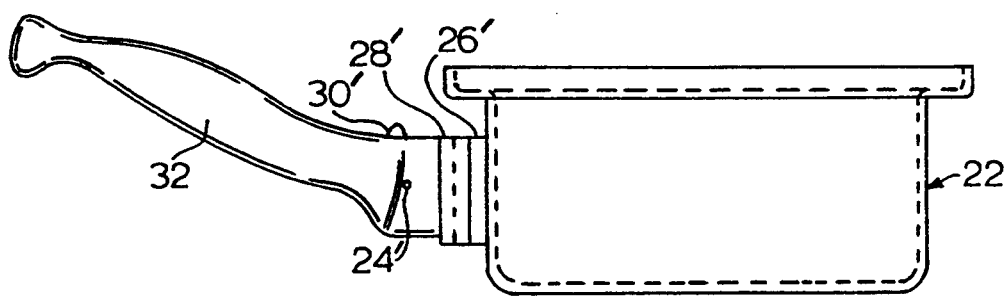
FIG. 2 is a side elevation view of a cooking vessel having a single pot handle attached thereto according to the invention.

A further illustration of the handle of the invention appears in FIG. 2 where a single pan handle 32 is mounted to sauce pan 22. Rail 26' and channel 28' are substantially identical to comparable components which were described above in relation to FIG. 1, including a cam lock 30' and a pivot pin 24'.

Figure 3:
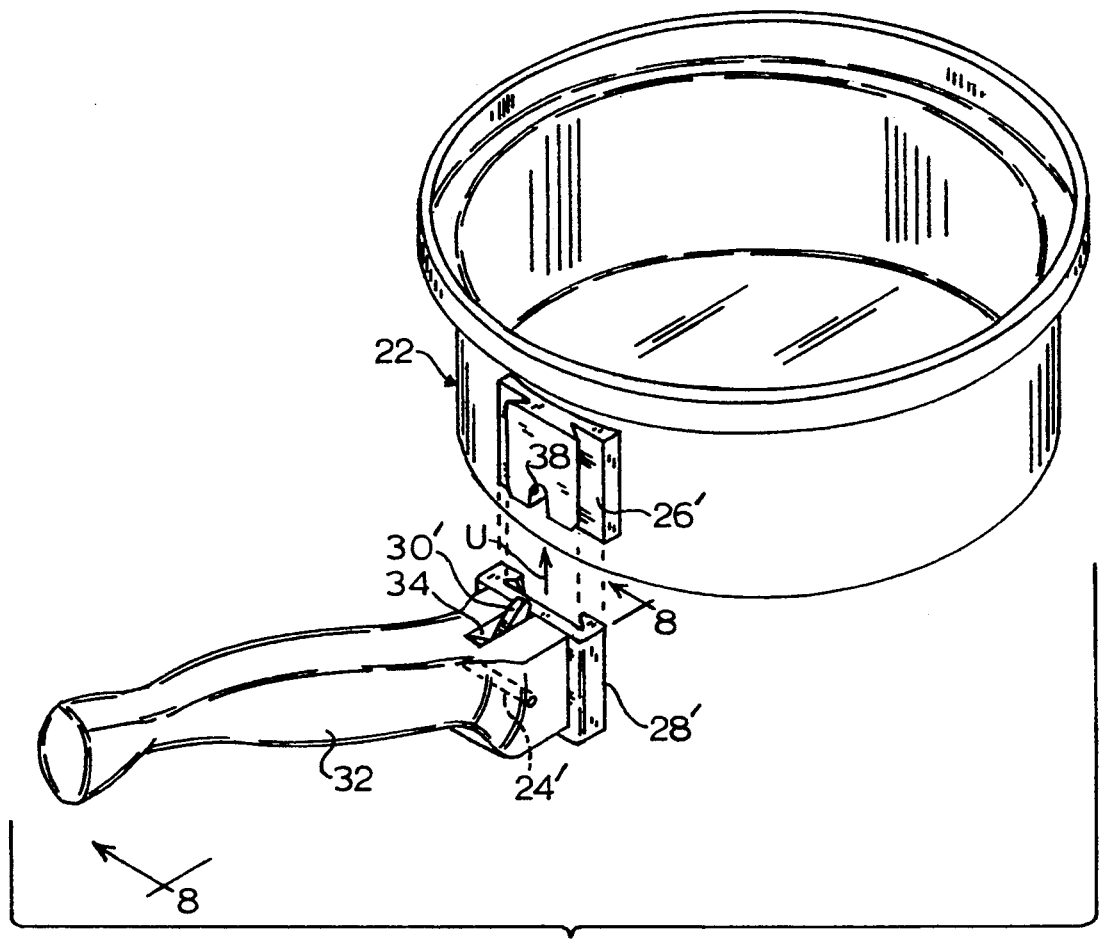
FIG. 3 is an exploded perspective view of a pot with a handle positioned for assembly thereto.

FIG. 3 shows sauce pan 22 and pan handle 32 each having respective connective rail and channel components mounted thereto and positioned for engagement. Pan handle 32 is raised from below sauce pan 22 in the direction indicated by the arrow U with channel 28' aligned with rail 26'. The configuration disclosed wherein the handle component slides upward from below the pot component assures that even if the locking device provided is not engaged, the handle will support the pot. Whereas the arrangement of a channel being mounted on the handle and a rail being mounted on a vessel in a vertical orientation exemplifies the preferred embodiment, other relative orientations of these components are equally satisfactory.

Typical cooking vessels to which this invention applies are formed of metal and are either cylindrical or conical. The rail component and the vessel are formed of compatible metals so the two are assembled by welding. Other materials, such as glass, ceramics or plastics will also benefit from the disclosure herein. In certain applications, the engagement components described, specifically the rail and the channel, may be molded integral with the respective vessel and handle. The typical handle is formed of a plastic or of wood and is adapted to receiving screws to mount the appropriate engagement component. Other shapes of vessel, vessels used within an oven rather than on a stove top, and a wide variety of handle forms are susceptible to the benefits of the present invention.

Figure 6:
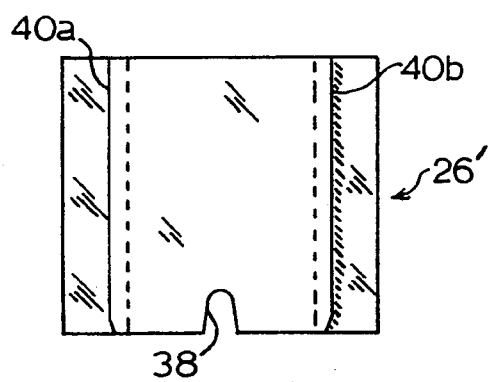
FIG. 6 is a front elevation view of the rail of FIG. 4.
Figure 7:
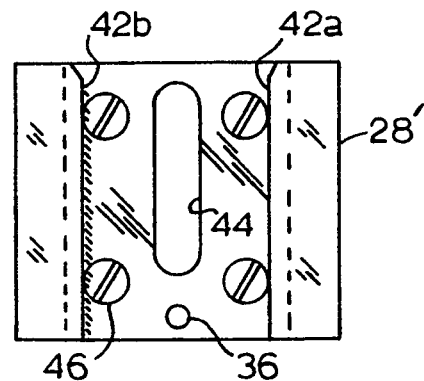
FIG. 7 is a front elevation view of the channel of FIG. 5.

Alignment between any vessel and a respective handle is accomplished in both the vertical and the horizontal direction according to the invention. The horizontal alignment is accomplished by the engagement of rail 26' and channel 28' as seen in FIGS. 3–7. Vertical alignment in this context positions the handle relative to the mounting rail at the correct height on the side of the vessel. Rail 26' has a slot 38 formed as a depression in its outer vertical surface at a location along its lower edge near the center (FIG. 6). Channel 28' has a pin 36 pressed into a hole drilled into its forward surface near the lower edge at the center (FIG. 7) so that when channel 28' is engaged with rail 26', pin 36 engages slot 38 to provide for accurate vertical alignment between the mating components. In substance, pin 36 permits channel 28' to be brought up to an initial height equal to that of rail 26', but not beyond.

So that rail 26' mates smoothly with the side of the vessel to which it is mounted, surface 27 (FIG. 4) is concavely curved to match the outside shape of the vessel. The mounting surface 29 of channel 28' (FIG. 5) is of an appropriate shape to match the shape of the end of the handle on which it mounts. As described above, pin 36 of channel 28' is positioned to engage slot 38 of rail 26' and prevent handle 32 from being raised beyond its aligned position.

In order for the handle to be securely mounted to the vessel, blades 40a, 40b of rail 26' must fit snugly into respective grooves 42a, 42b of channel 28'. To allow a tight fit and still be reasonably easy to assemble, the lower outer corners of blades 40a, 40b (FIG. 4) and the upper inner corners of grooves 42a, 42b (FIG. 5) are tapered complementarily. Channel 28' is preferably mounted to the end of handle 32 by means of screws 46.

Figure 8:
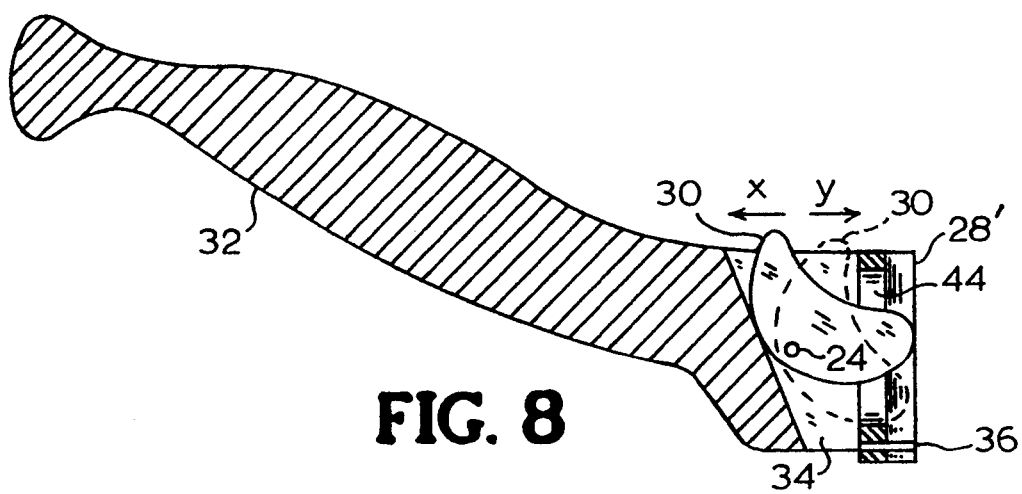
FIG. 8 is a cross-sectional view taken in the direction of line 8—8 of FIG. 3.
Figure 4:
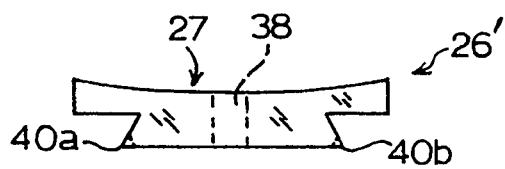
FIG. 4 is a top plan view of a handle-mounting rail according to the invention.
Figure 5:
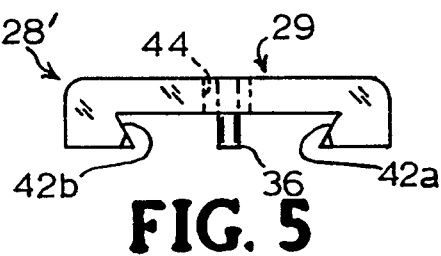
FIG. 5 is a top plan view of a handle-mounting channel according to the invention.

Once handle 32 is mounted to vessel 22 with rail 26' fit within channel 28' and with pin 36 fit into slot 38, a cam lock 30' (FIG. 8) is pivoted so as to protrude through aperture 44 (see FIG. 7) about pivot pin 24' in the direction indicated by arrow X into position to effectively lock against rail 26' and thus secure handle 32 to vessel 22. Since pin 36 acts to prevent handle 32 from moving further upward, the purpose of cam lock 30' is to prevent handle 32 from moving freely downward. The shape of cam lock 30' is such that if handle 32 is pushed downward, cam lock 30' will lock more tightly against the mating surface of rail 26'.

Disengagement and removal of handle 32 from vessel 22 is equally simple. First, cam lock 30' is opened by rotating in the direction indicated by arrow Y. Next, handle 32 is pressed downward and rail 26' is removed from channel 28'.

While the invention has been described with reference to specific embodiments thereof, it will be appreciated that numerous variations, modifications, and embodiments are possible, and accordingly, all such variations, modifications, and embodiments are to be regarded as being within the spirit and scope of the invention.

What is claimed is:

1. A cooking vessel assembly, comprising:
   (a) a cooking vessel formed with an upstanding side wall having an outer side surface;
   (b) a first engagement component fixedly attached to said outer side surface of said cooking vessel in a selected position and orientation;
   (c) a cooking vessel handle having an end surface;
   (d) a second engagement component fixedly attached to said handle end surface and adapted to slidingly engage said first engagement component in a selected direction;
   (e) a pair of cooperating contacting members on respective first and second engagement components in a manner to limit the relative travel between said engagement components; and
   (f) locking means mounted on said handle adjacent said handle end surface and moveable between a first position in which said handle is removable from said vessel and a second position in which said handle is securely locked to said vessel when said first and second engagement components are engaged.

2. The cooking vessel assembly as claimed in claim 1 wherein said cooking vessel has a central vertical axis and said first engagement component is attached to said vessel side surface and said second engagement component is attached to said handle end surface each in a position and orientation to restrict relative movement therebetween to be substantially parallel to said central axis of said vessel.

3. The cooking vessel assembly as claimed in claim 1, wherein said first contacting member comprises a slot and said second contacting member comprises a pin configured and positioned to enter said slot to prevent said first and second engagement component from moving relative to one another beyond a mutually aligned position.

4. The cooking vessel assembly as claimed in claim 1, wherein said first and second engagement components are respectively a rail having a pair of tapered inwardly upper corners and a channel having a pair of outwardly tapered lower corners.

5. The cooking vessel assembly as claimed in claim 1, wherein said locking means comprises a pivotably mounted cam configured and mounted to said vessel handle to lockingly engage a mating surface of said vessel.

6. The cooking vessel assembly as claimed in claim 1, wherein said vessel is formed of metal and said first engagement component is formed of a similar metal and welded to said vessel.

7. The cooking vessel assembly as claimed in claim 1, wherein mating surfaces of said vessel and said first engagement component are complementarily curved.

8. The cooking vessel assembly as claimed in claim 4, wherein said first engagement component is formed integral with said vessel.

9. The cooking vessel assembly as claimed in claim 4, wherein said second engagement component is formed integral with said handle.

10. The cooking vessel assembly as claimed in claim 8, wherein said second engagement component is formed integral with said handle.

* * * * *